United States Patent
Mashio et al.

(10) Patent No.: US 10,825,582 B1
(45) Date of Patent: Nov. 3, 2020

(54) CABLE CONNECTING STRUCTURE, MEMBER FOR CABLE CONNECTING STRUCTURE, AND METHOD OF MANUFACTURING CABLE CONNECTING STRUCTURE

(71) Applicant: SUMITOMO ELECTRIC INDUSTRIES, LTD., Osaka (JP)

(72) Inventors: Shoji Mashio, Osaka (JP); Taiki Kaneda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/826,525

(22) Filed: Mar. 23, 2020

(30) Foreign Application Priority Data

May 20, 2019  (JP) .................................. 2019-094565

(51) Int. Cl.
| | |
|---|---|
| H02G 3/00 | (2006.01) |
| H01B 7/42 | (2006.01) |
| H01B 7/20 | (2006.01) |
| H01B 7/295 | (2006.01) |
| H01B 9/00 | (2006.01) |

(52) U.S. Cl.
CPC ............ *H01B 7/421* (2013.01); *H01B 7/207* (2013.01); *H01B 7/295* (2013.01); *H01B 9/006* (2013.01)

(58) Field of Classification Search
CPC ................................ H02G 3/00; H02G 15/00
See application file for complete search history.

(56) References Cited

U.S. PATENT DOCUMENTS

| | | | | | |
|---|---|---|---|---|---|
| 6,018,459 | A | * | 1/2000 | Carlson | F28F 13/003 165/80.3 |
| 6,105,247 | A | * | 8/2000 | Varreng | H02G 15/10 29/868 |
| 9,224,520 | B2 | * | 12/2015 | Spalding | H01B 3/30 |
| 2012/0097444 | A1 | * | 4/2012 | Hilberts | H02G 1/14 174/77 R |

FOREIGN PATENT DOCUMENTS

JP    2001-231148    8/2001

* cited by examiner

*Primary Examiner* — Chau N Nguyen
(74) *Attorney, Agent, or Firm* — IPUSA, PLLC

(57) ABSTRACT

A cable connecting structure includes three three-phase power cable pairs respectively including a pair of power cables that are mutually connected, three insulating rubber connecting tubes covering connecting sections of the three three-phase power cable pairs, respectively, a steel pipe accommodating portions of each of the three three-phase power cable pairs, and the three rubber connecting tubes, and a heat dissipation material. The heat dissipation material is provided between the steel pipe and each of the three rubber connecting tubes, and makes contact with the steel pipe and each of the three rubber connecting tubes. The heat dissipation material includes a heat dissipating metal that has a melting point lower than a melting point of the steel pipe.

21 Claims, 6 Drawing Sheets

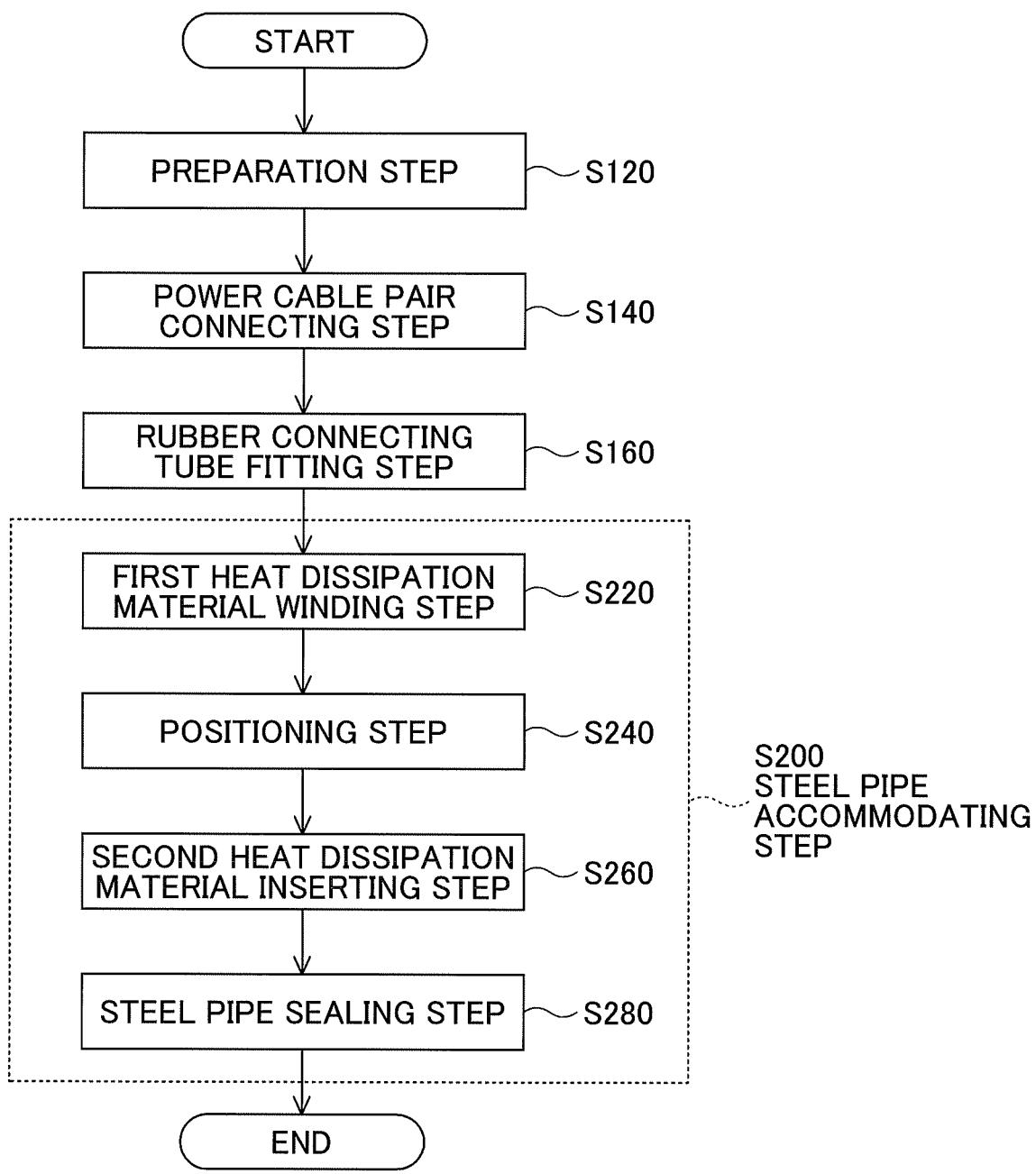

CABLE CONNECTING STRUCTURE, MEMBER FOR CABLE CONNECTING STRUCTURE, AND METHOD OF MANUFACTURING CABLE CONNECTING STRUCTURE

CROSS-REFERENCE TO RELATED APPLICATIONS

This application is based upon and claims priority to Japanese Patent Application No. 2019-094565 filed on May 20, 2019, the entire contents of which are incorporated herein by reference.

BACKGROUND OF THE INVENTION

1. Field of the Invention

Embodiments of the present disclosure are related to a cable connecting structure, a member for the cable connecting structure, and a method of manufacturing the cable connecting structure.

2. Description of the Related Art

Various fire prevention measures are taken with respect to the cable connecting structure to which a power cable is connected, to cope with the ground fault of the power cable. For example, Japanese Laid-Open Patent Publication No. 2001-231148 describes an oil filled (OF) cable connecting section provided with such fire prevention measures.

SUMMARY OF THE INVENTION

One object of the embodiments of the present disclosure is to provide a cable connecting structure, a member for the cable connecting structure, and a method of manufacturing the cable connecting structure, which can improve heat dissipation of the cable connecting structure during constant operation, and stably reduce spreading of the damage when the ground fault of the power cable occurs.

According to one aspect of the embodiments of the present disclosure, a cable connecting structure includes three three-phase power cable pairs respectively including a pair of power cables that are mutually connected; three insulating rubber connecting tubes covering connecting sections of the three three-phase power cable pairs, respectively; a steel pipe accommodating portions of each of the three three-phase power cable pairs, and the three rubber connecting tubes; and a heat dissipation material provided between the steel pipe and each of the three rubber connecting tubes, and making contact with the steel pipe and each of the three rubber connecting tubes, wherein the heat dissipation material includes a heat dissipating metal that has a melting point lower than a melting point of the steel pipe.

According to another aspect of the embodiments of the present disclosure, a member for a cable connecting structure, includes three insulating rubber connecting tubes covering connecting sections of three three-phase power cable pairs respectively including a pair of power cables that are mutually connected, respectively; a steel pipe accommodating portions of each of the three three-phase power cable pairs, and the three rubber connecting tubes; and a heat dissipation material provided between the steel pipe and each of the three rubber connecting tubes, and making contact with the steel pipe and each of the three rubber connecting tubes, wherein the heat dissipation material includes a heat dissipating metal that has a melting point lower than a melting point of the steel pipe.

According to still another aspect of the embodiments of the present disclosure, a method of manufacturing a cable connecting structure, including forming three three-phase power cable pairs respectively including a pair of power cables that are mutually connected; covering connecting sections of the three three-phase power cable pairs by three insulating rubber connecting tubes, respectively; and accommodating portions of each of the three three-phase power cable pairs, and the three rubber connecting tubes, inside a steel pipe, and arranging a heat dissipation material between the steel pipe and each of the three rubber connecting tubes to making contact with the steel pipe and each of the three rubber connecting tubes, wherein the heat dissipation material includes a heat dissipating metal that has a melting point lower than a melting point of the steel pipe.

Other objects and further features of the present disclosure will be apparent from the following detailed description when read in conjunction with the accompanying drawings.

BRIEF DESCRIPTION OF THE DRAWINGS

FIG. 5 is a flow chart for explaining a method of manufacturing the cable connecting structure according to one embodiment of the present invention.

DESCRIPTION OF THE EMBODIMENTS

Embodiments of the Present Disclosure

Figure 1:
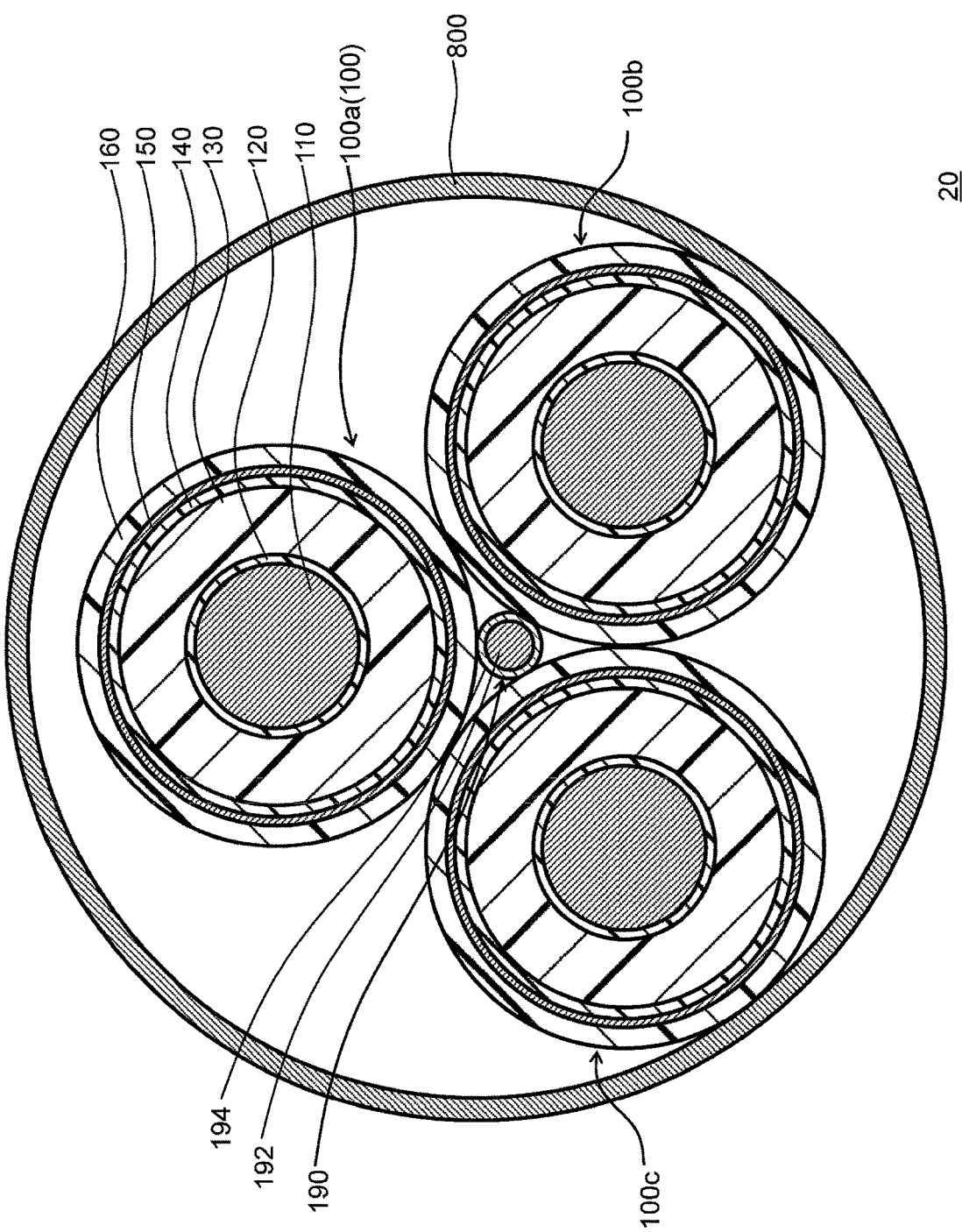
FIG. 1 is a cross sectional view of a power cable according to one embodiment of the present invention along a plane perpendicular to an axial direction.

<Observations Made by the Inventors and Others>
First, observations made by the present inventors and others, will be described.

[Single-Core Cable]
Conventionally, during three-phase power cable installation (or laying), the power cables of each of the phases are separately connected. The power cables may be a single-core oil-impregnated insulation cable, such as an oil filled (OF) cable, or a single-core solid insulation cable, such as a crosslinked polyethylene insulated polyvinyl chloride (PVC) sheathed cable (or crosslinked polyethylene (XLPE) cable). At each cable connecting structure, a connecting section of the power cable is accommodated inside a metal pipe, to provide water sealing and grounding. By using a nonmagnetic metal, such as copper, for the metal pipe, it is possible to reduce the heat generated from the metal pipe due to eddy current loss that occurs when the power cable transmits power. In addition, the effects of heat dissipation and water sealing are improved by filling the inside of the metal pipe by an insulating oil or a compound.

However, when the ground fault of the connecting section of the power cable occurs inside the metal pipe, the insulating oil or the compound inside the metal pipe may vaporize due to the heat caused by the ground fault. When the insulating oil or the compound vaporizes, the pressure inside the metal pipe may increase rapidly.

For this reason, conventionally, as described in Japanese Laid-Open Patent Publication No. 2001-231148, for example, an outer periphery of the power cable and an outer periphery of the metal pipe may be covered by an aramid fiber sheet, to reduce spreading of the damage when the ground fault of the power cable occurs.

However, in order to obtain a sufficient fire prevention effect by the cable connecting structure, the outer periphery of the power cable to be connected and the outer periphery of the connecting metal pipe need to be completely covered by the aramid fiber sheet or the like, for the entire installation range exposed to air, and separately for each of the three phases. As a result, the work to provide coverage by the aramid fiber sheet or the like becomes difficult, to increase both the cost of the parts or components and the work cost.

[Pipe Type Cable]

In a pipe type oil filled (OF) cable or a high pressure fluid filled (HPFF) pipe type cable (hereinafter respectively also referred to as a "POF cable"), the OF cables for the three phases are installed altogether in a steel cable pipe. At the connecting structure of the POF cable, the connecting sections of the OF cables for the three phases are accommodated altogether in a steel pipe. In addition, at the cable connecting structure, the insulating oil communicates between the steel pipe and the steel cable pipe.

In the case of the POF cable, the pressure increase of the insulating oil is reduced by communicating the steel pipe and the steel cable pipe with a sufficiently large cross sectional area at the cable connecting structure, even when the ground fault of the OF cable occurs inside the steel pipe at the cable connecting structure. Further, when the OF cable transmits power, the formation of a hot spot is reduced, because natural convection or forced circulation of the insulating oil occurs inside these steel pipes.

However, in the case of the POF cable, because a high pressure is applied to the insulating oil inside the steel cable pipe, the insulating oil may leak from corroded portions of the steel cable pipe. The leaked insulating oil may cause undesirable effects on the surrounding environment.

Hence, the OF cables of the POF cable are recently being replaced by the solid insulation cable, such as the crosslinked polyethylene insulated polyvinyl chloride (PVC) sheathed cable (or crosslinked polyethylene (XLPE) cable.

However, in the pipe type solid insulation cable, the inside of the steel pipe is not filled with the insulating oil by considering the above described effects on the environment. For this reason, during constant operation, the inside of the steel pipe becomes an air pocket in the cable connecting structure, because the inside of the steel pipe is not filled with the insulating oil. As a result, during constant operation, a local temperature rise may occur inside the steel pipe.

On the other hand, in order to reduce the local temperature rise inside the steel pipe, it is conceivable to fill the inside of the steel pipe with the compound in the cable connecting structure. But similar to the case of the single-core power cable described above, the compound may vaporize when the ground fault of the power cable occurs, to rapidly increase the pressure inside the steel pipe.

As described above for the single-core power cable and the pipe type cable, there are demands to improve heat dissipation of the cable connecting structure during constant operation, and stably reduce spreading of the damage when the ground fault of the power cable occurs.

The present invention is conceived by the present inventors, based on the above described observations made by the present inventors and others.

Embodiments of Present Disclosure

Next, embodiments of the present disclosure will be described in conjunction with the drawings.

[1] According to one aspect of the present disclosure, a cable connecting structure includes three three-phase power cable pairs respectively including a pair of power cables that are mutually connected; three insulating rubber connecting tubes covering connecting sections of the three three-phase power cable pairs, respectively; a steel pipe accommodating portions of each of the three three-phase power cable pairs, and the three rubber connecting tubes; and a heat dissipation material provided between the steel pipe and each of the three rubber connecting tubes, and making contact with the steel pipe and each of the three rubber connecting tubes, wherein the heat dissipation material includes a heat dissipating metal that has a melting point lower than a melting point of the steel pipe.

According to this structure, it is possible to improve the heat dissipation of the cable connecting structure during the constant operation, and stably reduce the spreading of the damage when ground fault of the power cable occurs.

[2] In the cable connecting structure according to [1] above, the heat dissipation material may include a porous metal.

According to this structure, when the ground fault occurs inside the steel pipe, the melted heat dissipation material can be vaporized immediately. By immediately vaporizing the melted heat dissipation material, it is possible to immediately form the stable discharge circuit, and sustain the arc current. As a result, it is possible to stably reduce the ground fault energy. Further, it is possible to reduce the heat generated from the heat dissipation material due to the eddy current loss that occurs during the constant operation.

[3] In the cable connecting structure according to [2] above, the heat dissipation material may have a porosity that is 50% or higher.

According to this structure, it is possible to stably reduce the ground fault energy when the ground fault occurs. In addition, it is possible to reduce the heat generated from the heat dissipation material due to the eddy current loss that occurs during the constant operation.

[4] In the cable connecting structure according to [2] above, the heat dissipation material on a side of the steel pipe may have a porosity lower than a porosity of the heat dissipation material on a side of each of the three rubber connecting tubes.

According to this structure, it is possible to improve the heat dissipation of the cable connecting structure, and reduce the heat generated from the heat dissipation material on the side of the rubber connecting tube due to the eddy current loss.

[5] In the cable connecting structure according to [4] above, at least a portion of the heat dissipation material on the side of the steel pipe may include a solid metal.

According to this structure, even when manufacturing the porous metal having a low porosity is difficult, it is possible to easily form a difference in the porosities along the thickness direction of the heat dissipation material.

[6] In the cable connecting structure according to [4] or [5] above, an average porosity of the heat dissipation material along a thickness direction thereof may be 50% or higher.

According to this structure, it is possible to sufficiently obtain the effect of immediately vaporizing the heat dissipation material that melts, when the ground fault occurs inside the steel pipe. In addition, it is possible to sufficiently obtain the effect of reducing the pressure increase inside the steel pipe by utilizing the pores when the ground fault occurs inside the steel pipe.

[7] In the cable connecting structure according to any one of [1] to [6] above, the metal included in the heat dissipation material may have a relative permeability that is 1000 or higher.

According to this structure, it is possible to reduce the heat generated from the heat dissipation material due to the eddy current loss.

[8] In the cable connecting structure according to any one of [1] to [7] above, the heat dissipation material at a temperature of 20° C. may have a volume resistivity that is $1\times10^{-7}\Omega\cdot m$ or lower.

According to this structure, it is possible to reduce the fault ground energy because the heat dissipation material at the temperature of 20° C. has the volume resistivity that is $1\times10^{-7}\Omega\cdot m$ or lower.

[9] In the cable connecting structure according to any one of [1] to [8] above, the heat dissipation material on a side of the steel pipe may have a resistance lower than a resistance of the heat dissipation material on a side of each of the three rubber connecting tubes.

According to this structure, it is possible to improve the heat dissipation of the cable connecting structure, and reduce the heat generated from the heat dissipation material on the side of the rubber connecting tube due to the eddy current loss.

[10] In the cable connecting structure according to any one of [1] to [9] above, each power cable of the three three-phase power cable pairs may include, from a center toward an outer periphery thereof, a conductor, an insulating layer, and a shielding layer, and the shielding layer of each of the three three-phase power cable pairs may be grounded altogether with the steel pipe.

According to this structure, it is possible to facilitate the work at the site.

[11] In the cable connecting structure according to any one of [1] to [10] above, at least a portion of the heat dissipation material may be fol. Led in a sheet shape.

According to this structure, it is possible to easily manufacture the cable connecting structure.

[12] In the cable connecting structure according to [11] above, at least a portion of the heat dissipation material may be wound around each of the three rubber connecting tubes.

According to this structure, it is possible to easily manufacture the cable connecting structure.

[13] The cable connecting structure according to any one of [1] to [12] above may further include a spacer configured to adjust positions of the three rubber connecting tubes inside the steel pipe.

According to this structure, the thermal conductivity (or heat dissipation) inside the steel pipe can be made uniform.

[14] According to another aspect of the present disclosure, a member for a cable connecting structure includes three insulating rubber connecting tubes covering connecting sections of three three-phase power cable pairs respectively including a pair of power cables that are mutually connected, respectively; a steel pipe accommodating portions of each of the three three-phase power cable pairs, and the three rubber connecting tubes; and a heat dissipation material provided between the steel pipe and each of the three rubber connecting tubes, and making contact with the steel pipe and each of the three rubber connecting tubes, wherein the heat dissipation material includes a heat dissipating metal that has a melting point lower than a melting point of the steel pipe.

According to this structure, it is possible to improve the heat dissipation of the cable connecting structure during the constant operation, and stably reduce the spreading of the damage when ground fault of the power cable occurs.

[15] According to still another aspect of the present disclosure, a method of manufacturing a cable connecting structure includes forming three three-phase power cable pairs respectively including a pair of power cables that are mutually connected; covering connecting sections of the three three-phase power cable pairs by three insulating rubber connecting tubes, respectively; and accommodating portions of each of the three three-phase power cable pairs, and the three rubber connecting tubes, inside a steel pipe, and arranging a heat dissipation material between the steel pipe and each of the three rubber connecting tubes to making contact with the steel pipe and each of the three rubber connecting tubes, wherein the heat dissipation material includes a heat dissipating metal that has a melting point lower than a melting point of the steel pipe.

According to this structure, it is possible to improve the heat dissipation of the cable connecting structure during the constant operation, and stably reduce the spreading of the damage when ground fault of the power cable occurs.

Details of Embodiments of Present Disclosure

Next, one embodiment of the present disclosure will be described, by referring to the drawings. The present invention is not limited to the described embodiments, and various variations, modifications, and substitutions may be made within the scope of the present disclosure.

One Embodiment (1) Power Cable

A power cable according to one embodiment of the present invention, which is to be connected to a cable connecting structure, will be described by referring to FIG. 1. FIG. 1 is a cross sectional view of the power cable according to one embodiment of the present invention along a plane perpendicular to an axial direction.

In the following description, an axial direction of a power cable 100 or the like refers to a direction of a center axis of the power cable 100 or the like. This axial direction of the power cable 100 or the like may also be referred to as a longitudinal direction of the power cable 100 or the like. In addition, a radial direction of the power cable 100 or the like refers to a direction perpendicular to the axial direction of the power cable 100 or the like. This radial direction of the power cable 100 or the like may also be referred to as a transverse (or short) direction of the power cable 100 or the like.

As illustrated in FIG. 1, the power cable 100 according to one embodiment, which is to be connected to the cable connecting structure, forms a pipe type solid insulation cable 20. More particularly, the pipe type solid insulation cable 20 includes the power cables 100, a return cable 190, and a steel cable pipe 800. The power cables 100 include power cables 100a, 100b, and 100c forming the three-phase power cables. Each of the power cables 100a, 100b, and 100c, forming the three-phase power cables, may also be referred to as "the power cable 100" when not distinguishing the power cables 100a, 100b, and 100c from one another.

The power cable 100 is formed as a solid insulation cable, for example, and includes, from a central portion thereof toward an outer peripheral portion thereof, a conductor 110, a conductor screen (or inner semiconducting layer) 120, an insulating layer 130, an insulating screen (or outer semiconducting layer) 140, a bedding (or bedding layer, not illustrated), a shielding layer (or metal sheath) 150, and a jacket (or anticorrosion layer) 160.

The conductor 110 is formed by twisting a plurality of copper wires, for example. The conductor screen 120 is formed by a resin layer including heat-resistant semiconducting tape or heat-resistant carbon powder, for example. For example, nylon or polyester may be used for the semiconducting tape. For example, ethylene ethylacrylate copolymer (EEA) or polyethylene may be used for the resin layer including the carbon powder. The insulating layer 130 includes crosslinked polyethylene, for example. The insulating screen 140 is formed by a resin layer including carbon powder, for example. For example, EEA and polyethylene may be used for the resin layer including the carbon powder. The bedding is famed by the so-called bedding tape, for example. The shielding layer 150 is formed to provide a path for a fault current, in addition to providing electrostatic shielding and electromagnetic induction shielding. More particularly, the shielding layer 150 is formed by a copper laminate, for example. The jacket 160 includes crosslinked polyethylene, high-density polyethylene, or polyvinyl chloride (PVC), for example.

The three-phase power cables 100 are inserted into the steel cable pipe 800. The three-phase power cables 100 are spirally twisted along the axial direction, for example.

In this embodiment, each of the three-phase power cables 100 does not include the so-called shield wire, for example. Instead, the return cable 190 is installed inside the steel cable pipe 800, for example, together with the three-phase power cables 100.

The return cable 190 is provided adjacent to the three-phase power cables 100 inside the steel cable pipe 800, for example. In this embodiment, the return cable 190 is arranged at a center of the three-phase power cables 100, for example.

The return cable 190 includes a conductor 192, and a jacket 194, for example. The conductor 192 is formed by twisting a plurality of copper wires, for example. The jacket 194 includes crosslinked polyethylene, high-density polyethylene, or PVC, for example.

The return cable 190 is grounded, for example. Hence, when the ground fault of the power cable 100 occurs, the return cable 190 can provide a path for the fault current.

In addition, because the return cable 190 is provided adjacent to the three-phase power cables 100, the shielding layer 150 of the power cable 100, the return cable 190, or the like may be grounded at both ends, as will be described later in more detail.

The steel cable pipe 800 accommodates the three-phase power cables 100, and the return cable 190, for example. The steel cable pipe 800 includes steel, for example. In addition, the steel cable pipe 800 is grounded, for example. Hence, when the ground fault of the power cable 100 occurs, the steel cable pipe 800 can provide a path for the fault current.

In this embodiment, the steel cable pipe 800 is a reused steel cable pipe of a POF cable. In other words, in the pipe type solid insulation cable 20 according to this embodiment, the OF cable of the POF cable is replaced by the power cable 100 that is used as the solid insulation cable. Of course, the steel cable pipe 800 may be newly provided, instead of reusing or recycling the steel cable pipe of the POF cable.

(2) Cable Connecting Structure

Figure 2A:
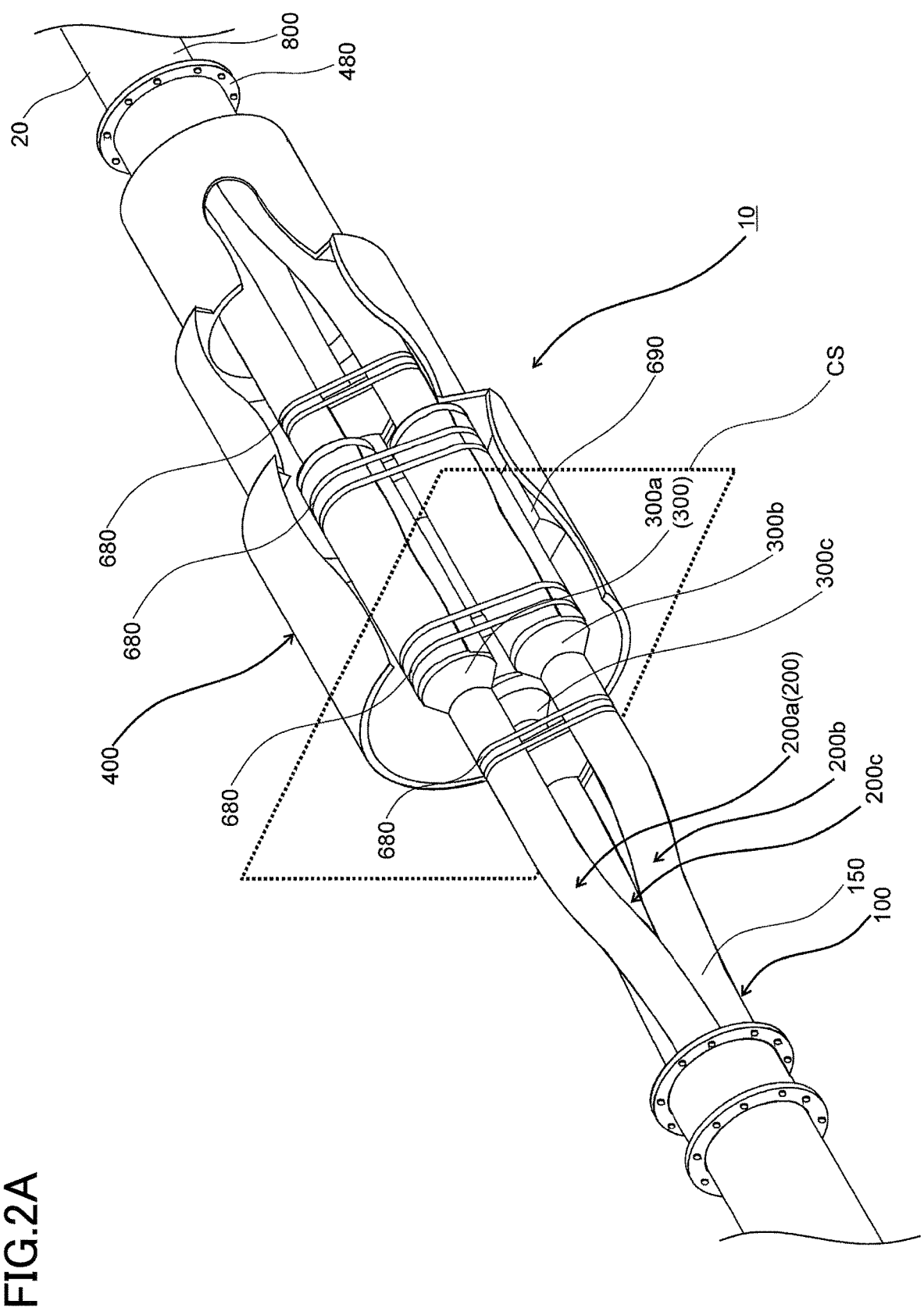
FIG. 2A is a perspective view illustrating a cable connecting structure according to one embodiment of the present invention.
Figure 2B:
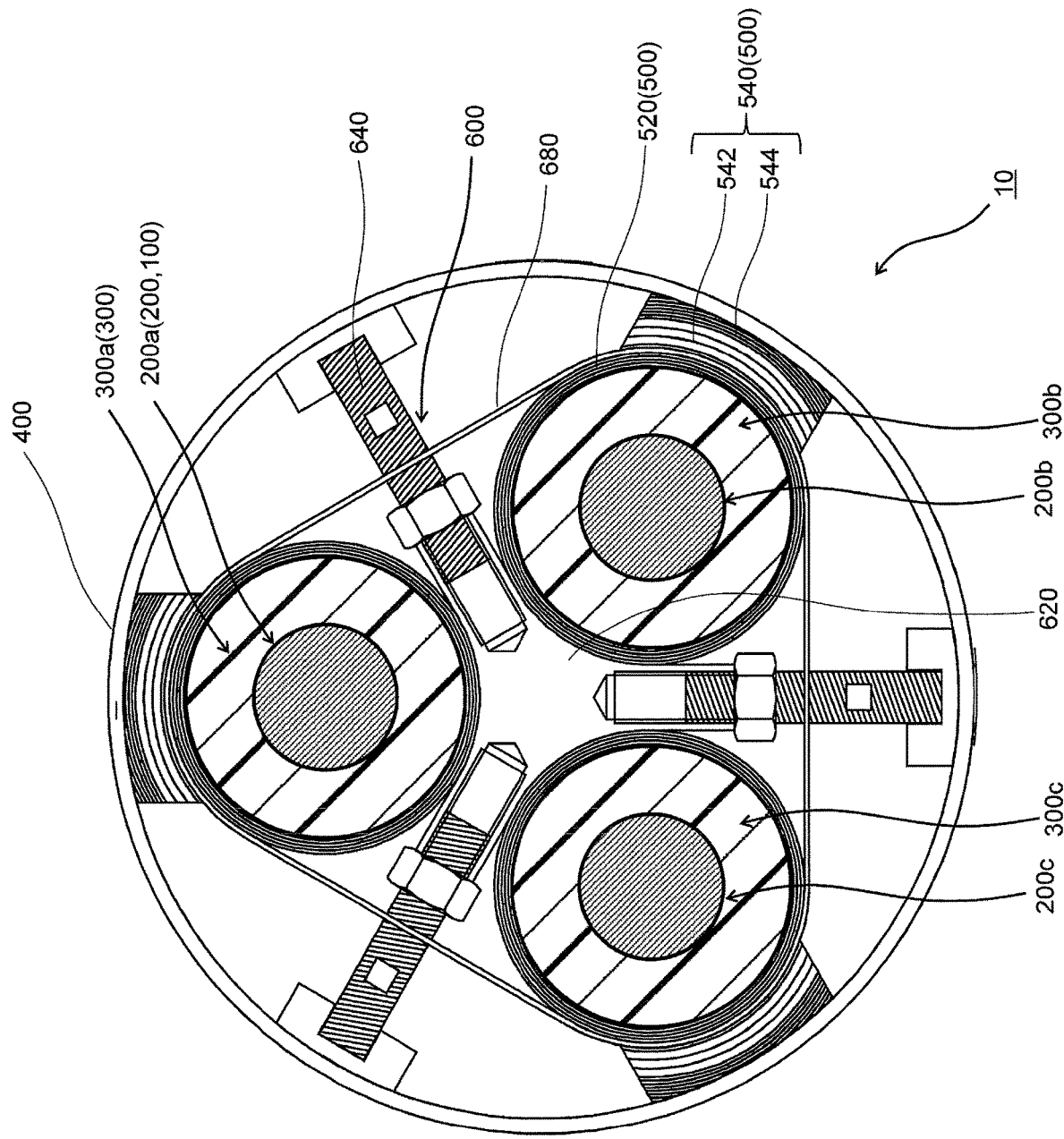
FIG. 2B is a cross sectional view illustrating the cable connecting structure according to one embodiment of the present invention.

Next, the cable connecting structure according to one embodiment of the present invention will be described, by referring to FIG. 2A and FIG. 2B. FIG. 2A is a perspective view illustrating the cable connecting structure according to one embodiment of the present invention. In FIG. 2A, the illustration of a portion of a steel pipe 400 and a portion of a structure inside the steel pipe 400 is omitted, so that the structure inside the steel pipe 400 is visible. FIG. 2B is a cross sectional view illustrating the cable connecting structure according to one embodiment of the present invention. FIG. 2B is the cross sectional view cut along a cross-section (or plane) CS in FIG. 2A. In FIG. 2B, the illustration of a portion of the hatchings is omitted. In addition, in FIG. 2B, the illustration of a layer structure of the power cable 100 and a structure of a rubber connecting tube 300 is omitted.

As illustrated in FIG. 2A and FIG. 2B, a cable connecting structure 10 according to this embodiment includes three-phase power cable pairs 200 (200a, 200b, and 200c), three rubber connecting tubes (or rubber units for main insulation) 300 (300a, 300b, and 300c), the steel pipe (or a protection pipe or a metal pipe) 400, a heat dissipation material 500, a spacer 600, and a binder 680, for example.

[Power Cable Pair]

The power cable pair 200 includes a pair of mutually connected power cables 100. More particularly, each of the pair of power cables 100 is stripped in stages (or steps) along the axial direction. In other words, the conductor 110, the insulating layer 130, the insulating screen 140, and the shielding layer 150 are successively exposed in this order from one end of the power cable 100. The conductors 110 of the pair of power cables 100 contact each other in a butting state where center axes thereof match, and are connected by pressing of a conductor connecting pipe (not illustrated).

In this embodiment, the three-phase power cable pair 200 is provided in correspondence with each of the three-phase power cables 100, for example.

[Rubber Connecting Tube]

The rubber connecting tube 300 is made of an insulating rubber, for example. The rubber connecting tube 300 is formed as an insulating tubular member having a hollow portion that penetrates along the axial direction, for example. The rubber connecting tube 300 is provided so as to cover connecting sections of the power cable pair 200. More particularly, the rubber connecting tube 300 is fit onto the conductor connecting pipe and a portion of each of the pair of power cables 100, for example.

The rubber connecting tube 300 is provided as the so-called cold shrink tubing. In other words, the rubber connecting tube 300 has an inner diameter smaller than an outer diameter of the power cable 100 in a state where the rubber connecting tube 300 is not expanded. Hence, the rubber connecting tube 300 shrinks elastically at room temperature, to make close contact with the connecting sections of the power cable pair 200.

In addition, the rubber connecting tube 300 is formed to maintain insulation of the surroundings of the connecting sections of the power cable pair 200, and to relax the electric field at the surroundings of the connecting sections. More particularly, the rubber connecting tube 300 includes a rubber unit's inner semiconducting layer (not illustrated), the rubber unit's insulating layer (not illustrated), a stress cone section (not illustrated), and the rubber unit's outer semiconducting layer (not illustrated), for example. The rubber unit's inner semiconducting layer is semiconducting, and is formed to a tubular shape so as to cover an outer periphery of the conductor connecting pipe, for example. The rubber unit's insulating layer is insulating, and is provided so as to cover an outer periphery of the rubber unit's inner semiconducting layer, for example. The stress cone section is semiconducting, and is provided so as to expand and gradually separate from an inner peripheral surface of the rubber connecting tube 300 in a direction toward the center along the axial direction from each of two ends of the rubber connecting tube 300. The stress cone section makes contact with the insulating screen 140 at the stripped portion of the power cable 100. The rubber unit's outer semiconducting layer is semiconducting, and is provided so as to cover an outer periphery of the rubber unit's insulating layer.

A metal mesh tape may be wound around the rubber connecting tube 300, so as to cover the outer periphery of the rubber connecting tube 300.

In this embodiment, three rubber connecting tubes 300 are provided, so as to cover the respective connecting sections of the three-phase power cable pairs 200.

[Steel Pipe]

The steel pipe 400 accommodates portions of each of the three-phase power cable pairs 200, and the three rubber connecting tubes 300. The steel pipe 400 protects the portions of each of the three-phase power cable pairs 200, and the three rubber connecting tubes 300.

The steel pipe 400 is grounded at a transformer substation that is provided at a terminal end of the power cable 100, or at a plurality of points along a power transmission route. Hence, when the ground fault of the power cable 100 occurs, the steel pipe 400 can provide a path for the fault current.

The shielding layers 150 of the three-phase power cables 100 described above are grounded altogether with the steel pipe 400, for example. More particularly, the steel pipe 400 includes flange sections (or three-way junction plates) 480, for example. The flange sections 480 are provided at respective ends of the steel pipe 400, for example, to close the respective ends of the steel pipe 400. The three-phase power cables 100 are inserted into the flange section 480. In addition, the flange section 480 is connected to the shielding layer 150 of each of the three-phase power cables 100. Accordingly, the shielding layer 150 of each of the three-phase power cables 100 is mechanically and electrically connected to the steel pipe 400, and grounded together with the steel pipe 400.

The return cable 190 described above is connected to the flange section 480, for example, and grounded together with the shielding layer 150 of the three-phase power cable pairs 200 and the steel pipe 400. The return cable 190 does not necessarily have to be inserted through the steel pipe 400.

The steel pipe 400 is connected to the steel cable pipe 800 of the pipe type solid insulation cable 20 via the flange section 480.

In this embodiment, the inside of the steel pipe 400 is not filled with an insulating oil or a compound. A portion inside the steel pipe 400 may be filled with the insulating oil or the compound. However, from a viewpoint of reducing vaporization of the insulating oil or the compound when the ground fault occurs, the amount of insulating oil or compound inside the steel pipe 400 is preferably small.

[Heat Dissipation Material]

The heat dissipation material 500 includes a heat dissipating metal, for example. The heat dissipating properties of the heat dissipation material 500 refers to properties including a thermal conductivity higher than that of the insulating oil or the compound, and a heat release greater than that of the insulating oil or the compound.

In addition, the heat dissipation material 500 has a melting point lower than a melting point of the steel pipe 400, for example. Hence, when the ground fault occurs inside the steel pipe 400, it is possible to melt or vaporize the heat dissipation material 500 before the steel pipe 400.

Further, the heat dissipation material 500 is provided between the steel pipe 400 and each of the three rubber connecting tubes 300, and makes contact with the steel pipe 400 and each of the three rubber connecting tubes 300. For this reason, it is possible to improve the heat dissipation of the cable connecting structure 10.

Figure 3:
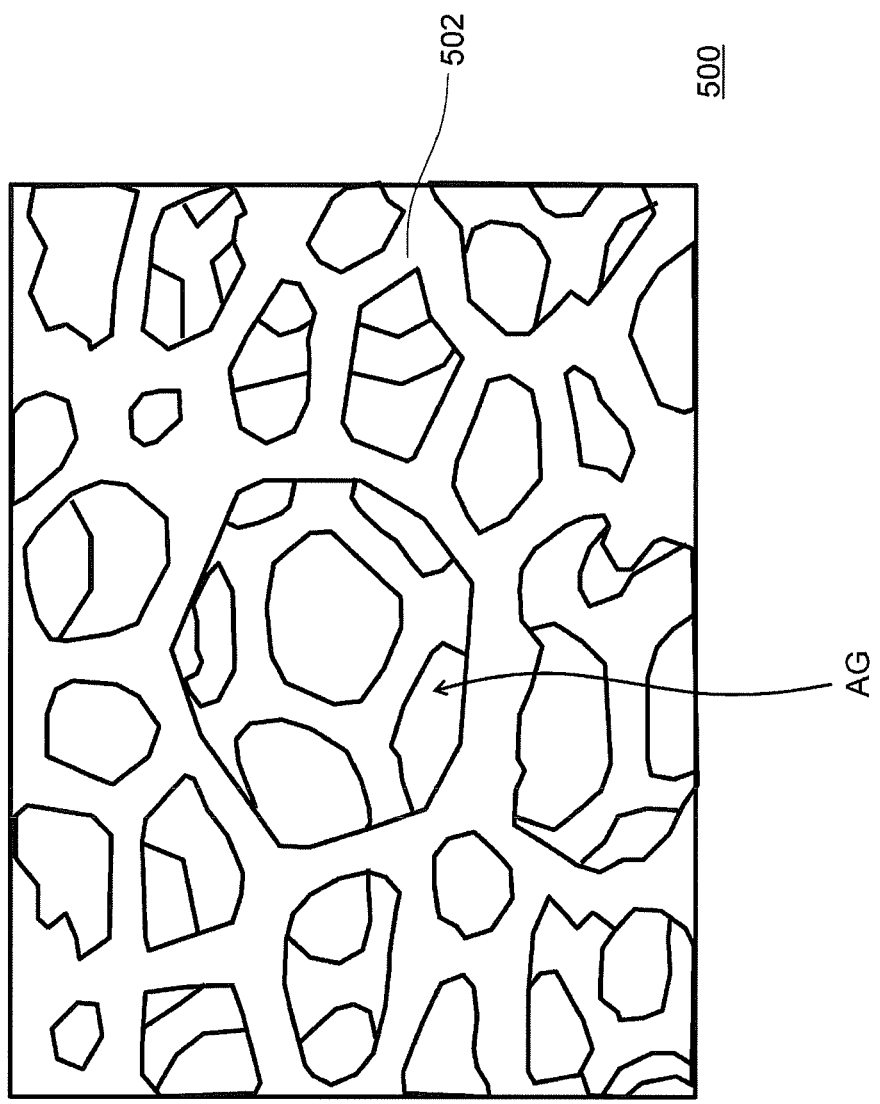
FIG. 3 is a cross sectional view schematically illustrating a heat dissipation material on an enlarged scale.

Next, the heat dissipation material 500 according to this embodiment will be described, by referring to FIG. 3. FIG. 3 is a cross sectional view schematically illustrating the heat dissipation material on an enlarged scale. A rectangular outer frame illustrated in FIG. 3 indicates a predetermined observation field of view.

As illustrated in FIG. 3, the heat dissipation material 500 according to this embodiment includes a porous metal, for example. The porous metal refers to a metal that includes pores (or air gaps) AG, as illustrated in FIG. 3.

The heat dissipation material 500 according to this embodiment includes mesh portions 502 in which predetermined thin metal wires are distributed three-dimensionally in meshes, for example. For example, the pore AG is formed between the mesh portions 502. The pores AG are distributed three-dimensionally at random, and communicate throughout the entire heat dissipation material 500.

The area of contact between the heat dissipation material 500 and air can be made large, because the heat dissipation material 500 includes the porous metal. Hence, when the ground fault occurs inside the steel pipe 400, it is possible to immediately vaporize the heat dissipation material 500 that melts. By immediately vaporizing the heat dissipation material 500, it is possible to immediately form a stable discharge circuit, and stably reduce the ground fault energy.

In addition, because the heat dissipation material 500 includes the pores AG, it is possible to reduce the pressure increase inside the steel pipe 400 when the ground fault occurs inside the steel pipe 40 by utilizing the pores AG, even when the metal of the heat dissipation material 500 or the like vaporizes inside the steel pipe 400, or the ground fault inside the steel pipe 400 causes expansion of air.

Moreover, because the heat dissipation material 500 includes the pores AG, it is possible to divide an eddy current circulation circuit by the pores AG when the power cable 100 transmits power. As a result, it is possible to reduce the heat generated from the heat dissipation material 500 due to the eddy current loss that occurs during the constant operation.

In this embodiment, a porosity (or a percentage of air gaps) of the heat dissipation material 500 is 50% or higher and preferably 80% or higher, for example. The porosity of the heat dissipation material 500 refers to a ratio of the volume of the pores AG with respect to the volume of the heat dissipation material 500. For example, when a theoretical density of the heat dissipation material 500 in a bulk state where no pores exist therein is denoted by $\rho_0$, and a density of the heat dissipation material 500 in this embodiment is denoted by $\rho$, the porosity of the heat dissipation material 500 can be obtained from $(1-\rho/\rho_0) \times 100$.

When the porosity of the heat dissipation material 500 is lower than 50%, the effect of immediately vaporizing the heat dissipation material 500 that melts may not be sufficiently obtained when the ground fault occurs inside the steel pipe 400. In addition, when the porosity of the heat dissipation material 500 is lower than 50%, the effect of reducing the pressure increase inside the steel pipe 400 by utilizing the pores AG may not be sufficiently obtained when the ground fault occurs inside the steel pipe 400. Further, when the porosity of the heat dissipation material 500 is lower than 50%, the effect of dividing the eddy current circulation circuit by the heat dissipation material 500 may not be sufficiently obtained. Consequently, it may not be possible to stably reduce the heat generated from the heat dissipation material 500 due to the eddy current loss that occurs during the constant operation.

On the other hand, according to this embodiment, the area of contact between the heat dissipation material 500 and the air can be made sufficiently large, by setting the porosity of the heat dissipation material 500 to 50% or higher. In this case, it is possible to sufficiently obtain the effect of immediately vaporizing the heat dissipation material 500 that melts, when the ground fault occurs inside the steel pipe 400. In addition, by setting the porosity of the heat dissipation material 500 to 50% or higher, it is possible to sufficiently obtain the effect of reducing the pressure increase inside the steel pipe 400 by utilizing the pores AG when the ground fault occurs inside the steel pipe 400. Further, by setting the porosity of the heat dissipation material 500 to 50% or higher, it is possible to sufficiently obtain the effect of dividing the eddy current circulation circuit by the heat dissipation material 500. As a result, it is possible to stably reduce the heat generated from the heat dissipation material 500 due to the eddy current loss that occurs during the constant operation. Moreover, by setting the porosity of the heat dissipation material 500 to 50% or higher, it is possible to stably obtain the effect of immediately vaporizing the heat dissipation material 500 that melts when the ground fault occurs inside the steel pipe 400. Furthermore, it is possible to stably obtain the effect of reducing the pressure increase inside the steel pipe 400 by utilizing the pores AG when the ground fault occurs inside the steel pipe 400. It is also possible to stably reduce the heat generated from the heat dissipation material 500 due to the eddy current loss that occurs during the constant operation.

An upper limit value of the porosity of the heat dissipation material 500 is not particularly limited. However, from viewpoints of obtaining a predetermined rigidity of the heat dissipation material 500 and stably manufacturing the heat dissipation material 500, the porosity of the heat dissipation material 500 is preferably 98% or lower, for example.

In this embodiment, a relative permeability of the metal included in the heat dissipation material 500 is lower than the relative permeability of iron. For example, the relative permeability of the metal included in the heat dissipation material 500 is 1000 or lower, preferably 100 or lower, and more preferably 10 or lower. In other words, the metal included in the heat dissipation material 500 is more preferably nonmagnetic than ferromagnetic.

When the relative permeability of the metal included in the heat dissipation material 500 exceeds 1000, the heat may more easily be generated from the heat dissipation material 500 due to the eddy current loss that occurs during the constant operation. On the contrary, because the relative permeability of the metal included in the heat dissipation material 500 is set to 1000 or lower in this embodiment, it is possible to reduce the heat generated from the heat dissipation material 500 due to the eddy current loss that occurs during the constant operation. In addition, by preferably setting this relative permeability to 100 or lower, or more preferably setting this relative permeability to 10 or lower, it is possible to stably reduce the heat generated from the heat dissipation material 500 due to the eddy current loss that occurs during the constant operation.

A lower limit value of the relative permeability of the metal included in the heat dissipation material 500 is preferably close to 1 as much as possible.

In this embodiment, a volume resistivity (or volume resistivity value) of the heat dissipation material 500 at a temperature of 20° C. is $1\times10^{-7}\Omega\cdot m$ or lower, for example. The volume resistivity of the heat dissipation material 500, made of an alloy which will be described later, is a value that is obtained by averaging measured volume resistivities of the heat dissipation material 500 having a predetermined thickness.

When the volume resistivity of the heat dissipation material 500 at the temperature of 20° C. exceeds $1\times10^{-7}\Omega\cdot m$, an arc resistance between the steel pipe 400 and the power cable pair 200 (or fault point) where the ground fault occurred may become high, when the ground fault occurs in at least one of the three-phase power cable pairs 200 inside the steel pipe 400.

But in this embodiment, because the volume resistivity of the heat dissipation material 500 at the temperature of 20° C. is set to $1\times10^{-7}\Omega\cdot m$ or lower, it is possible to improve the conductivity, and obtain a sufficiently high thermal conductivity. In addition, because the volume resistivity of the heat dissipation material 500 at the temperature of 20° C. is set to $1\times10^{-7}\Omega\cdot m$ or lower, it is possible to reduce the arc resistance between the steel pipe 400 and the power cable pair 200 where the ground fault occurred. As a result, it is possible to reduce the ground fault energy that is obtained from the following formula (1).

$$\text{(Fault Ground Energy)} = \text{(Fault Ground Current)}^2 \times \text{(Arc Resistance)} \times \text{(Duration)} \qquad (1)$$

A lower limit of the volume resistivity of the heat dissipation material 500 at the temperature of 20° C. is not particularly limited. However, from a viewpoint of reducing the cost of the heat dissipation material 500, the volume resistivity of the heat dissipation material 500 at the temperature of 20° C. is preferably to $1.68\times10^{-8}\Omega\cdot m$ or higher.

Examples of the metal included in the heat dissipation material 500 and satisfying the above described conditions include copper, aluminum zinc, cobalt, nickel, tin, and alloys thereof, for example.

In this embodiment, at least a portion of the heat dissipation material 500 is formed to a sheet shape (or thin plate shape), for example. In this example, a plurality of sheets of the heat dissipation material 500 are laminated, and the laminated structure of the heat dissipation material 500 is provided inside the steel pipe 400. Hence, the heat dissipation material 500 can easily be interposed between the steel pipe 400 and each of the three rubber connecting tubes 300.

In this embodiment, the heat dissipation material 500 is provided so as to overlap at least a shortest route between the steel pipe 400 and each of the three rubber connecting tubes 300, for example. In other words, the heat dissipation material 500 is provided between the steel pipe 400 and each of the three rubber connecting tubes 300 along at least the radial direction of the steel pipe 400. Hence, the fault current generated in the power cable pair 200 can be made to flow toward the steel pipe 400 via the shortest route.

More particularly, the heat dissipation material 500 includes a first heat dissipation material 520, and a second heat dissipation material 540, for example. The first heat dissipation material 520 and the second heat dissipation material 540 may be formed to a sheet shape described above, respectively.

The first heat dissipation material 520 is wound around each of the three rubber connecting tubes 300, for example. In this case, the heat dissipation material 500 can easily be interposed between the steel pipe 400 and each of the three rubber connecting tubes 300. In addition, by providing the first heat dissipation material 520 on the outer side of the rubber connecting tube 300, it is possible to improve the heat dissipation from the rubber connecting tube 300.

The first heat dissipation material 520 is wound around each of the three rubber connecting tubes 300 a plurality of times (that is, for a plurality of turns), for example. In this case, it is possible to secure a predetermined thickness of the first heat dissipation material 520 from the outer periphery of the rubber connecting tube 300.

The thickness of the first heat dissipation material 520 (or first layer) is thinner than a maximum thickness of the second heat dissipation material 540 which will be described later, for example. More particularly, the thickness of the first heat dissipation material 520 is 1 mm or greater and 4 mm or less, for example. In this case, it is possible to easily wind the first heat dissipation material 520 around the rubber connecting tube 300.

The second heat dissipation material 540 is provided in a gap between the steel pipe 400 and the first heat dissipation material 520 that is wound around each of the three rubber connecting tubes 300, for example. The second heat dissipation material 540 is a sheet-shaped strip, for example, and is inserted in the above described gap in a state where the second heat dissipation material 540 is curved to follow along an inner peripheral surface of the steel pipe 400. Hence, the first heat dissipation material 520 and the steel pipe 400 can be connected via the second heat dissipation material 540.

The second heat dissipation material 540 is provided in a plurality of layers between the first heat dissipation material 520 and the steel pipe 400, for example. In this case, it is possible to easily fill the gap between the steel pipe 400 and the first heat dissipation material 520.

The second heat dissipation material 540 includes an inner heat dissipation material 542, and an outer heat dissipation material 544, for example. The inner heat dissipation material 542 makes contact with the first heat dissipation material 520, for example, the outer heat dissipation material 544 is provided between the steel pipe 400 and the inner heat dissipation material 542, for example. The inner heat dissipation material 542 is thicker than the outer heat dissipation material 544, for example. More particularly, the thickness of the inner heat dissipation material 542 is greater than 4 mm and 100 mm or less, and the thickness of the outer heat dissipation material 544 is 1 mm or greater and 4 mm or less. In this case, a predetermined thickness of the second heat dissipation material 540 can easily be secured by the inner heat dissipation material 542, and the gap between the steel pipe 400 and the inner heat dissipation material 542 can be tightly filled by the outer heat dissipation material 544.

In this embodiment, the first heat dissipation material 520 and the second heat dissipation material 540 include the same metal, for example. In addition, the first heat dissipation material 520 and the second heat dissipation material 540 have the same porosity. Accordingly, it is possible to reduce imbalance in the heat dissipation and reduce imbalance in the arc resistance.

[Binder and Spacer]

The binder 680 binds the three-phase power cable pairs 200, for example. More particularly, the binder 680 binds the three rubber connecting tubes 300, for example. The binder 680 may bind the three-phase power cables 100 at outer portions of the rubber connecting tubes 300, for example. Hence, when the ground fault of at least one of the three-phase power cable pairs 200 occurs and a stress acts to separate the three-phase power cable pairs 200 from one another, it is possible to reduce the separation of the three-phase power cable pairs 200 from one another, and reduce scattering of the three-phase power cable pairs 200.

The binder 680 is formed by a metal, for example. Examples of the metal forming the binder 680 include stainless steel, steel, aluminum, copper, or the like, for example. Hence, the three-phase power cable pairs 200 can be firmly bound by the binder 680.

The spacer 600 is formed to adjust positions of the three rubber connecting tubes 300 inside the steel pipe 400, for example. For example, the spacer 600 can easily adjust the distances from the steel pipe 400 to the three rubber connecting tubes 300 to equal distances.

In this embodiment, the spacer 600 includes a core section 620, and a support section 640, for example.

The core section 620 is inserted between the three rubber connecting tubes 300, for example. The core section 620 includes three concave arcuate surfaces (not designated by reference numerals), for example, and the three rubber connecting tubes 300 make contact with the three concave arcuate surfaces, respectively. Hence, the core section 620 restricts movements of the three-phase power cable pairs 200 toward the center axis of the steel pipe 400.

The support section 640 supports the core section 620, while making contact with the inner peripheral portion of the steel pipe 400, so that the position of the core section 620 inside the steel pipe 400 is adjustable. More particularly, the support section 640 includes three setscrews (or headless screws, not designated by reference numerals), and three nuts (not designated by reference numerals). Each of the three setscrews is arranged on the core section 620 between two adjacent rubber connecting tubes 300 among the three rubber connecting tubes 300. One end of the setscrew mates with a portion of the core section 620, and the other end of the setscrew makes contact with a predetermined base (not designated by a reference numeral) on the inner peripheral portion of the steel pipe 400. The nut mates with the setscrew, and makes contact with a portion of the core section 620.

By adjusting the position of the nut on the setscrew of the support section 640, it is possible to adjust a projecting length of the setscrew from the core section 620, and adjust the position of the core section 620 inside the steel pipe 400. As a result, the positions of the three-phase power cable pairs 200 inside the steel pipe 400 can be adjusted, while maintaining the separation of the three-phase power cable pairs 200 constant.

A cradle 690 on which the three rubber connecting tubes 300 are set, may be provided inside the steel pipe 400. In this case, the three rubber connecting tubes 300 can be set on the cradle 690 when making the positional adjustment using the spacer 600. In addition, the cradle 690 can reduce the portion of the rubber connecting tube 300, not provided with the spacer 600, from hanging downward.

[Others]

In this embodiment, a space is provided inside the steel pipe 400 at a portion where the heat dissipation material 500 is not provided. Hence, when the ground fault inside the steel pipe 400 causes expansion of air, it is possible to cause air convection in the space inside the steel pipe 400, and reduce a rapid pressure increase inside the steel pipe 400.

[Specific Dimensions or the Like]

A nominal voltage of the power cable 100 applied with the cable connecting structure 10 according to this embodiment is 66 kV or greater and 345 kV or lower, for example. The outer diameter of the power cable 100 is 30 mm or greater and 130 mm or less, for example.

A length of the rubber connecting tube 300 along the axial direction is 500 mm or greater and 800 mm or less, for example. A maximum outer diameter of the rubber connecting tube 300 is 90 mm or greater and 230 mm or less, for example.

A length of the steel pipe 400 along the axial direction is 2000 mm or greater and 5000 mm or less, for example. An outer diameter of the steel pipe 400 is 300 mm (or 12 inches) or greater and 710 mm (or 28 inches) or less, for example. A thickness of the steel pipe 400 is 5 mm or greater and 15 mm or less, for example.

The dimensions or the like described above are examples, and do not limit the scope of the present disclosure.

(3) Power Transmission System

Figure 4:
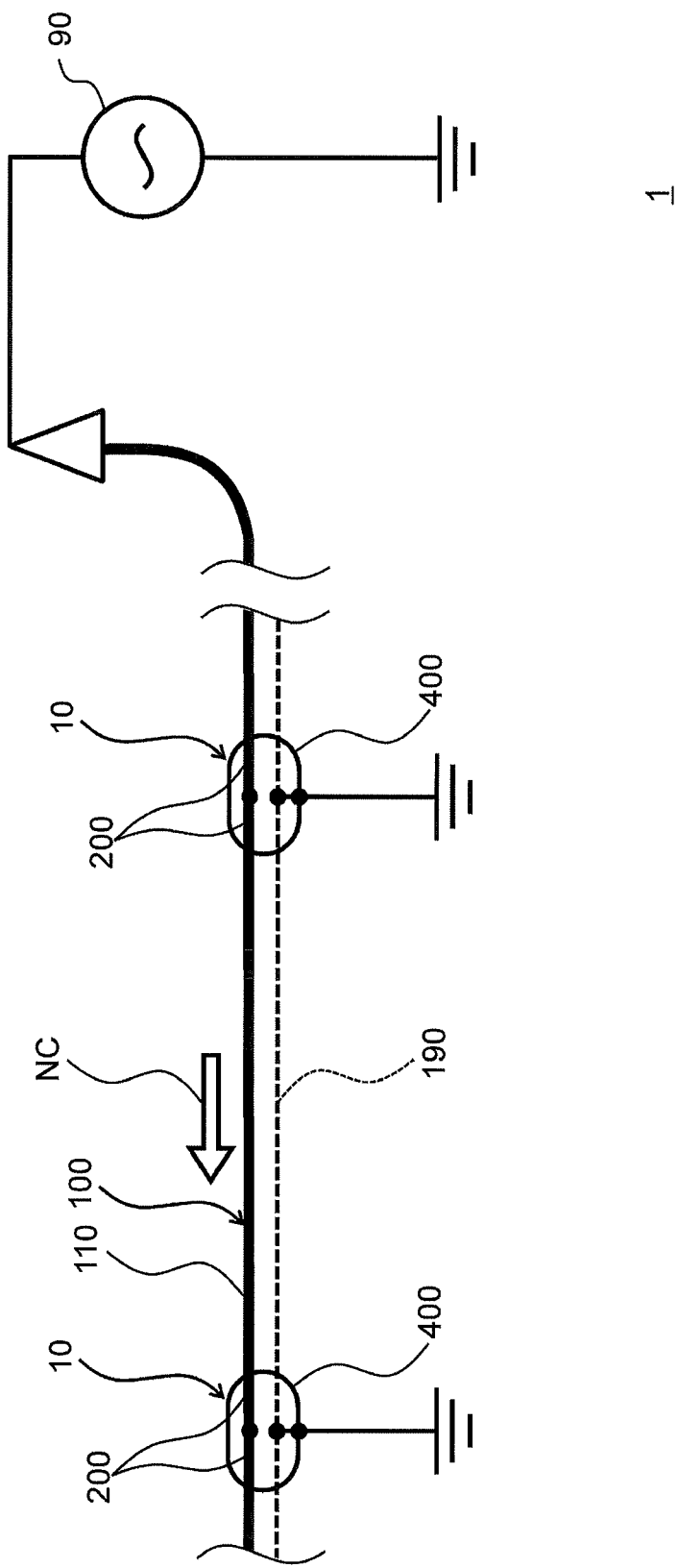
FIG. 4 is a diagram schematically illustrating a configuration of a power transmission system according to one embodiment of the present invention.

Next, a power transmission system 1 according to one embodiment will be described, by referring to FIG. 4. FIG. 4 is a diagram schematically illustrating a configuration of the power transmission system according to one embodiment of the present invention. For the sake of convenience, FIG. 4 illustrates only the power cable 100 for one phase, and the illustration of the power cables 100 for the other two phases is omitted.

In the following description, directly grounding an element refers to directly connecting the element to the ground, without passing through a resistor element or the like.

As illustrated in FIG. 4, the power transmission system 1 according to this embodiment includes a transformer substation 90, that is provided as a power source, the three-phase power cables 100, and a plurality of cable connecting structures 10, for example.

The power transmission system 1 according to this embodiment is configured as a system that is grounded at both ends. More particularly, at each of a pair of adjacent cable connecting structures 10 that are separated by a predetermined distance, the return cable 190 is directly grounded together with the steel pipe 400 and the shielding layer 150 of the three-phase power cable pair 200.

In this embodiment, both ends of the return cable 190 of the pair of adjacent cable connecting structures 10 are grounded, as described above. Hence, a closed circuit is formed between the return cable 190 and the ground (or earth). When such a closed circuit is formed and a normal current (NC) flows through the conductor 110 of each of the three-phase power cables 100, an induced current may flow in the return cable 190 in a direction opposite to the direction of the current flowing through the conductor 110, so as to cancel the magnetic field generated on the outer periphery of the power cable 100.

However, in this embodiment, the return cable 190 is provided adjacent to the three-phase power cables 100, at the center of the three-phase power cables 100, for example. For this reason, the induced current generated in the return cable 190 due to the electromagnetic induction caused by the magnetic field on the outer periphery of the power cable 100 for each phase, is canceled between the pair of adjacent cable connecting structures 10 due to a phase error for each phase. As a result, in this embodiment, a circulating current caused by the induced current does not flow, or is hard to flow, even though both ends between the pair of adjacent cable connecting structures 10 are grounded.

Further, the power transmission system 1 according to this embodiment is configured as the system that is grounded at both ends, so that the fault current can always flow to the ground at the transformer substation 90 when the ground fault occurs in the power cable 100. For this reason, it is possible to reduce divergence of the fault current.

(4) Method of Manufacturing Cable Connecting Structure (Cable Connecting Method)

Next, a method of manufacturing the cable connecting structure according to one embodiment will be described, by referring to FIG. 2A, FIG. 2B, and FIG. 5. FIG. 5 is a flow chart for explaining the method of manufacturing the cable connecting structure according to one embodiment of the present invention.

As illustrated in FIG. 5, the method of manufacturing the cable connecting structure according to this embodiment includes preparation step S120, power cable pair connecting step S140, rubber connecting tube fitting step S160, and steel pipe accommodating step S200. The steel pipe accommodating step 200 according to this embodiment includes first heat dissipation material winding step S220, positioning step S240, second heat dissipation material inserting step S260, and steel pipe sealing step S280.

[Preparation Step S120]

First, the three-phase power cables 100, the conductor connecting pipes, the rubber connecting tubes 300, the steel pipe 400, the heat dissipation material 500, the spacer 600, and the binder 680, forming the cable connecting structure 10, are prepared.

In this state, the inner diameters of the rubber connecting tubes 300 are expanded using predetermined expanding members. Examples of the expanding member include an inner core formed by an inner core ribbon (both not illustrated) that is wound spirally, an expanding pipe (not illustrated), or the like, for example.

In addition, in this state, each power cable 100 is stripped from one end in stages (or steps) along the axial direction. Hence, the conductor 110, the insulating layer 130, the insulating screen 140, and the shielding layer 150 are successively exposed in this order from one end of the power cable 100.

After the parts or components forming the cable connecting structure 10 are prepared, the three-phase power cables 100 are inserted into the respective rubber connecting tubes 300 and the steel pipe 400, and the rubber connecting tubes 300 and the steel pipe 400 are let loose at predetermined positions of the three-phase power cables 100. In this state, the steel pipe 400 is connected to the steel cable pipe 800 of the pipe type solid insulation cable 20 via the flange section 480.

[Power Cable Pair Connecting Step S140]

After inserting the three-phase power cables 100 into the respective rubber connecting tubes 300 and the steel pipe 400, the conductors 110 of the pair of power cables 100 are made to contact each other in the butting state where center axes thereof match inside the conductor connecting pipe. The conductors 110 of the pair of power cables 100, in the butting state, are connected by pressing of the conductor connecting pipe. The three-phase power cable pairs 200 are formed in the manner described above.

[Rubber Connecting Tube Fitting Step S160]

After the power cable pair connecting step S140 is completed, the connecting sections of each of the three-phase power cable pairs 200 are covered by the three rubber connecting tubes 300. More particularly, the rubber connecting tubes 300 having the expanded inner diameters are moved to positions overlapping the conductor connecting pipe from the predetermined positions of the three-phase power cables 100 where the rubber connecting tubes 300 were let loose. After arranging the rubber connecting tubes 300 to the predetermined positions, the expanding members are removed from one end of the rubber connecting tubes 300 along the axial direction, to allow the rubber connecting tubes 300 to shrink. As a result, the rubber connecting tube 300 can be fit onto the connecting section of the power cable pair 20, in close contact with the connecting section of the power cable pair 20.

[Steel Pipe Accommodating Step S200]

After the rubber connecting tube fitting step S160 is completed, the portions of each of the three-phase power cable pairs 200, and the three rubber connecting tubes 300, are accommodated inside the steel pipe 400. In this state, the heat dissipation material 500 is arranged between the steel pipe 400 and each of the three rubber connecting tubes 300, so that the heat dissipation material 500 makes contact with the steel pipe 400 and each of the three rubber connecting tubes 300.

More particularly, the steel pipe accommodating step S200 may be performed according to the following procedures, for example.

[First Heat Dissipation Material Winding Step S220]

After the rubber connecting tube fitting process S160 is completed, the first heat dissipation material 520 is wound around each of the three rubber connecting tubes 300 in a state where the inner diameters of the three rubber connecting tubes 300 have shrunk.

[Positioning Step S240]

After the first heat dissipation material winding step S220 is completed, approximately one-half of the steel pipe 400 is arranged to cover the portions of each of the three-phase power cable pairs 200, and the three rubber connecting tubes 300, and fixed by welding. After one-half of the steel pipe 400 is arranged in this manner, the positions of the three rubber connecting tubes 300 inside the steel pipe 400 are adjusted using the spacer 600. For example, the spacer 600 adjusts the distances from the steel pipe 400 to the three rubber connecting tubes 300 to equal distances.

[Second Heat Dissipation Material Inserting Step S260]

After the positioning step S240 is completed, approximately one-half of the second heat dissipation material 540 along the axial direction is inserted into the gap between the steel pipe 400 and the first heat dissipation material 520 that is wound around each of the three rubber connecting tubes 300.

[Steel Pipe Sealing Step S280]

After the second heat dissipation material inserting step S260 is completed, the remaining half of the steel pipe 400 is arranged to cover the portions of each of the three-phase power cable pairs 200, and the three rubber connecting tubes 300, and approximately one-half of the second heat dissipation material 540 along the axial direction is inserted into the remaining half of the steel pipe 400. Thereafter, connecting sections of the steel pipe 400 are welded, to seal the steel pipe 400.

The cable connecting structure 10 according to this embodiment can be manufactured by the above described steps or processes.

(5) Advantageous Features of Embodiment

According to this embodiment, it is possible to obtain at least one of the following advantageous features or effects (a) through (o).

(a) According to this embodiment, the heat dissipation material 500 is provided between the steel pipe 400 and each of the three rubber connecting tubes 300, and the heat dissipation material 500 makes contact with the steel pipe 400 and each of the three rubber connecting tubes 300. Hence, by the provision of the heat dissipation material 500, it is possible to improve the heat dissipation of the cable connecting structure 10 during the constant operation, even when the inside of the steel pipe 400 is not filled with the insulating oil or compound.

(b) Because the inside of the steel pipe 400 is not filled with the insulating oil or compound, it is possible to reduce the pressure increase inside the steel pipe 400 caused by the vaporization of the insulating oil or compound, even when the ground fault occurs inside the steel pipe 400. For this reason, it is possible to reduce a burst that may be caused by the ground fault.

(c) Because the heat dissipation material 500, including the metal, is interposed between the steel pipe 400 and each of the three rubber connecting tubes 300, the heat dissipation material 500 can be melted or vaporized before the steel pipe 400 when the ground fault occurs inside the steel pipe 400. By melting or vaporizing the heat dissipation material 500, it is possible to form a stable discharge circuit (or current path) from the location of the ground fault to the steel pipe 400. Hence, it is possible to reduce the arc resistance between the steel pipe 400 and the three rubber connecting tubes 300. As a result, it is possible to reduce the ground fault energy.

According to the above described features (b) and (c), this embodiment can stably reduce the spreading of the damage when ground fault of the power cable 100 occurs.

(d) According to this embodiment, it is possible to reduce the spreading of the damage when the ground fault occurs, by simply interposing the heat dissipation material 500, including the metal, inside the steel pipe 400. In other words, compared to the case where the outer periphery of the steel pipe 400 is covered by the aramid fiber sheet, this embodiment can more easily reduce the spreading of the damage when the ground fault occurs. Hence, the work associated with manufacturing the cable connecting structure 10 at a site can be facilitated, and it is possible to reduce both the cost of the parts or components, and the increase of the work cost.

(e) By including the porous metal in the heat dissipation material 500, it is possible to increase the area of contact between the heat dissipation material 500 and the air. For this reason, when the ground fault occurs inside the steel pipe 400, the melted heat dissipation material 500 can be vaporized immediately. By immediately vaporizing the melted heat dissipation material 500, it is possible to immediately form the stable discharge circuit, and sustain the arc current. As a result, it is possible to stably reduce the ground fault energy.

(f) Because the heat dissipation material 500 includes the pores AG, it is possible to increase the volume of the air inside the steel pipe 400. Hence, when the ground fault occurs inside the steel pipe 400, and the metal of the heat dissipation material 500 or the like vaporizes inside the steel pipe 400, or the ground fault inside the steel pipe 400 causes the expansion of air, it is possible to reduce the pressure increase inside the steel pipe 400 by utilizing the pores AG.

(g) Because the heat dissipation material 500 includes the pores AG, when the power cable 100 transmits power during the constant operation and the magnetic field is generated on the outer periphery of the power cable 100, it is possible to divide, by the pores AG, the eddy current circulation circuit caused by the electromagnetic induction due to the magnetic field on the outer periphery of the power cable 100. Thus, it is possible to reduce the eddy current loss at the heat dissipation material 500. As a result, it is possible to reduce the heat generated from the heat dissipation material 500 due to the eddy current loss that occurs during the constant operation.

(h) Because the heat dissipation material 500 includes the pores AG, it is possible to improve the bendability and the processibility of the heat dissipation material 500. Hence, the heat dissipation material 500 can easily be deformed according to the shape inside the steel pipe 400. For example, the heat dissipation material 500 can be wound around the outer periphery of the rubber connecting tube 300, or inserted into the gap between the steel pipe 400 and the rubber connecting tubes 300 according to the shape of the gap. As a result, the cable connecting structure 10 including the heat dissipation material 500 can be manufactured with ease.

(i) Because the heat dissipation material 500 includes the pores AG, the heat dissipation material 500 can absorb the expansion of the rubber connecting tubes 300 when the ground fault occurs inside the steel pipe 400. For this reason, even when the heat dissipation material 500 is in close contact with the steel pipe 400 and the rubber connecting tubes 300, it is possible to reduce an excessive stress from being applied to the steel pipe 400 when the ground fault occurs.

(j) By setting the porosity of the heat dissipation material 500 to 50% or higher, it is possible to make the area of contact between the heat dissipation material 50 and the air sufficiently large. In this case, it is possible to sufficiently obtain the effect of immediately vaporizing the melted heat dissipation material 500 when the ground fault occurs inside the steel pipe 400. In addition, by setting the porosity of the heat dissipation material 500 to 50% or higher, it is possible to sufficiently obtain the effect of reducing the pressure increase inside the steel pipe 400 by utilizing the pores AG when the ground fault occurs inside the steel pipe 400. Further, by setting the porosity of the heat dissipation material 500 to 50% or higher, it is possible to sufficiently divide the eddy current circulation circuit by the pores AG in the heat dissipation material 500. Accordingly, it is possible to stably reduce the heat generated from the heat dissipation material 500 due to the eddy current loss that occurs during the constant operation.

(k) By setting the relative permeability of the metal included in the heat dissipation material 500 to 1000 or lower, it is possible to reduce the heat generated from the heat dissipation material 500 due to the eddy current loss that occurs during the constant operation.

(l) By setting the volume resistivity of the heat dissipation material 500 at the temperature of 20° C. to $1 \times 10^{-7} \Omega \cdot m$ or lower, it is possible to reduce the arc resistance between the steel pipe 400 and the power cable pair 200 where the ground fault occurred. Hence, it is possible to reduce the ground fault energy.

(m) The shielding layers 150 of the three-phase power cable pairs 200 are grounded altogether with the steel pipe 400. For this reason, it is possible to facilitate the work at the site, compared to cross-bond grounding.

(n) By forming at least a portion of the heat dissipation material 500 into the sheet shape, it is possible to easily interpose the heat dissipation material 500 between the steel pipe 400 and each of the three rubber connecting tubes 300. For example, at least a portion of the heat dissipation material 500 may be round around each of the three rubber connecting tubes 300. As a result, it is possible to easily manufacture the cable connecting structure 10.

(o) The spacer 600 is formed to adjust the positions of the three rubber connecting tubes 300 inside the steel pipe 400. For example, the spacer 600 can easily adjust the distances from the steel pipe 400 to the three rubber connecting tubes 300 to equal distances. Hence, the thermal conductivity (or heat dissipation) of the heat dissipation material 500 inside the steel pipe 400 can be made uniform.

(6) Modifications of Embodiment

The embodiment described above may be modified as in modifications described hereunder. In the following description, only elements that differ from the above described embodiment will be described. Those elements of the modifications, that are substantially the same as the elements of the above described embodiment, are designated by the same reference numerals, and a description thereof will be omitted.

(6-1) First Modification of Embodiment

According to a first modification of the embodiment, the structure of the heat dissipation material 500 in the cable connecting structure 10 differs from that of the above described embodiment.

In this modification, the resistance (or volume resistivity) of the heat dissipation material 500 on the side of the steel pipe 400 is lower than the resistance (or volume resistivity) of the heat dissipation material 500 on the side of the rubber connecting tube 300, for example. More particularly, the second heat dissipation material 540 on the side of the steel pipe 400 includes copper, and the first heat dissipation material 520 on the side of the rubber connecting tube 300 includes nickel, for example.

Further, in this modification, the resistance of the heat dissipation material 500 may decrease in stages (or steps) from the side of the rubber connecting tube 300 toward the steel pipe 400, for example. In this case, the outer heat dissipation material 544 of the second heat dissipation material 540 on the side of the steel pipe 400 includes copper, the inner heat dissipation material 542 of the second heat dissipation material 540 on the side of the steel pipe 400 includes aluminum, and the first heat dissipation material 520 on the side of the rubber connecting tube 300 includes nickel, for example. Hence, it is possible to achieve a stage-by-stage (or step-by-step) resistance distribution.

The following features or effects are obtainable by this modification.

The heat dissipation material 500 on the side of the steel pipe 400 is separated from the power cable pairs 200, and relatively, the eddy current is unlikely to occur. On the other hand, because the heat dissipation material 500 on the side of the steel pipe 400 makes direct contact with the steel pipe 400, a sufficiently high thermal conductivity with respect to the steel pipe 400 is required.

The heat dissipation material 500 on the side of the rubber connecting tube 300 is separated from the steel pipe 400, and relatively, the requirement for a high thermal conductivity with respect to the steel pipe 400 is low. On the other hand, the heat dissipation material 500 on the side of the rubber connecting tube 300 is close to the power cable pair 200, and the eddy current is likely to occur. For this reason, the reduction of the eddy current is required for the heat dissipation material 500 on the side of the rubber connecting tube 300.

Hence, in this modification, the resistance of the heat dissipation material 500 on the side of the steel pipe 400 is set lower than the resistance of the heat dissipation material 500 on the side of the rubber connecting tube 300, so that the thermal conductivity of the heat dissipation material 500 on the side of the steel pipe 400 can be made higher than the thermal conductivity of the heat dissipation material 500 on the side of the rubber connecting tube 300. In this case, the heat generated during the constant operation can be efficiently transferred to the steel pipe 400 via the heat dissipation material 500 on the side of the steel pipe 400 and having the high thermal conductivity. As a result, it is possible to improve the heat dissipation of the cable connecting structure 10.

In addition, according to this modification, by making the resistance of the heat dissipation material 500 on the side of the rubber connecting structure 300, where the eddy current is likely to occur, higher than the resistance of the heat dissipation material 500 on the side of the steel pipe 400, it is possible to reduce the increase of the eddy current in the heat dissipation material 500 on the side of the rubber connecting tube 300. As a result, it is possible to reduce the heat generated from the heat dissipation material 500 on the side of the rubber connecting tube 300 due to the eddy current loss that occurs during the constant operation.

Therefore, according to this modification, it is possible to optimize the functions of the heat dissipation material 500 according to the position inside the steel pipe 400.

(6-2) Second Modification of Embodiment

According to a second modification of the embodiment, the porosity of the heat dissipation material 500 in the cable connecting structure 10 differs from that of the above described embodiment.

In this modification, the porosity of the heat dissipation material 500 on the side of the steel pipe 400 is lower than the porosity of the heat dissipation material 500 on the side of the rubber connecting tube 300, for example. More particularly, the porosity of the second heat dissipation material 540 on the side of the steel pipe 400 is lower than 80%, and the porosity of the first heat dissipation material 520 on the side of the rubber connecting tube 300 is 80% or higher, for example. In this modification, the second heat dissipation material 540 and the first heat dissipation material 520 include the same metal.

In addition, in this modification, the porosity of the heat dissipation material 500 may gradually decrease from the rubber connecting tube 300 toward the steel pipe 400, for example. In this case, the porosity of the outer heat dissipation material 544 of the second heat dissipation material 540 on the side of the steel pipe 400 is 50% or lower, the porosity of the inner heat dissipation material 542 of the second heat dissipation material 540 on the side of the steel pipe 400 is higher than 50% and lower than 80%, and the porosity of the first heat dissipation material 520 on the side of the rubber connecting tube 300 is 80% or higher, for example. As a result, it is possible to achieve a stage-by-stage (or step-by-step) porosity distribution.

Further, in this modification, at least a portion of the heat dissipation material 500 on the side of the steel pipe 400 may include a solid metal, that is, a non-porous metal having a porosity of 0%, for example. For example, the outer heat dissipation material 544 of the second heat dissipation material 540 on the side of the steel pipe 400 may be formed by the solid metal. In this case, even when manufacturing the porous metal having a low porosity is difficult, it is possible to easily form a difference in the porosities along the thickness direction of the heat dissipation material 500.

The closer the position of the heat dissipation material 500 becomes to the outer side of the power cable pair 200, the farther away the position of the heat dissipation material 500 becomes from the conductor 110 through which the normal current flows. For this reason, even when at least a portion of the heat dissipation material 500 on the side of the steel pipe 400 is formed by the solid metal, the eddy current generated at this portion of the heat dissipation material 500 can be made small. As a result, it is possible to reduce the heat generated from the heat dissipation material 500 on the side of the steel pipe 400 due to the eddy current loss that occurs during the constant operation.

In addition, in this modification, the average porosity along the thickness direction of the heat dissipation material 500 is preferably 50% or higher, for example. In this case, when the ground fault occurs inside the steel pipe 400, it is possible to sufficiently obtain the effect of immediately vaporizing the melted heat dissipation material 500. Further, when the ground fault occurs inside the steel pipe 400, it is possible to sufficiently obtain the effect of reducing the pressure increase inside the steel pipe 400 by utilizing the pores AG.

According to this modification, the thermal conductivity of the heat dissipation material 500 on the side of the steel pipe 400 can be made higher than the thermal conductivity of the heat dissipation material 500 on the side of the rubber connecting tube 300, by making the porosity of the heat dissipation material 500 on the side of the steel pipe 400 lower than the porosity of the heat dissipation material 500 on the side of the rubber connecting tube 300. In this case, it is possible to improve the thermal conductivity (or heat dissipation) of the cable connecting structure 10.

Moreover, according to this modification, it is possible to easily divide the eddy current circulation circuit by the pores AG in the heat dissipation material 500 on the side of the rubber connecting tube 300, by setting the porosity of the heat dissipation material 500, on the side of the rubber connecting structure 300 and in which the eddy current is likely to occur, higher than the porosity of the heat dissipation material 500 on the side of the steel pipe 400. As a result, it is possible to reduce the heat generated from the heat dissipation material 500 on the side of the rubber connecting tube 300 due to the eddy current.

In addition, according to this modification, it is possible to improve the bendability of the heat dissipation material 500 on the side of the rubber connecting tube 300, by setting the porosity of the heat dissipation material 500 on the side of the rubber connecting tube 300 higher than the porosity of the heat dissipation material 500 on the side of the steel pipe 400. Hence, the heat dissipation material 500 can easily be wound around the rubber connecting tube 300 having a radius of curvature smaller than the inner diameter of the steel pipe 400.

Other Embodiments of Present Disclosure

Although the embodiment of the present invention is described heretofore by referring to examples, the present invention is not limited to the above described embodiment, and various variations, modifications, and substitutions may be made without departing from the scope of the present invention.

Although a connecting target to be connected to the cable connecting structure 10 is the pipe type solid insulation cable 20 in the above described embodiment, the connecting target may be a three-phase single-core power cable (or solid insulation cable) having no steel cable pipe.

The return cable 190 is installed together with the three-phase power cables 100 in the above described embodiment, but the return cable 190 may be omitted. However, the return cable 190 is preferably installed as described above, since both ends of the return cable 190 of the pair of adjacent cable connecting structures 10 can be grounded.

In the above described embodiment, the gap is provided inside the steel pipe 400 at a portion where the heat dissipation material 500 is not provided. However, the heat dissipation material 500 may fill the inside of the steel pipe 400 in its entirety.

The steel pipe 400 is welded in the above described embodiment, but the steel pipe 400 may be fastened using screws, for example.

Hence, according to each of the embodiments and modifications described above, it is possible to provide a cable connecting structure, a member for the cable connecting structure, and a method of manufacturing the cable connecting structure, which can improve the heat dissipation of the cable connecting structure during constant operation, and stably reduce the spreading of the damage when ground fault of the power cable occurs.

Preferable Embodiments of Present Invention

Various aspects of the subject matter described herein may be set out non-exhaustively in the following numbered clauses:

Clause 1. A cable connecting structure comprising:
three three-phase power cable pairs respectively including a pair of power cables that are mutually connected;
three insulating rubber connecting tubes covering connecting sections of the three three-phase power cable pairs, respectively;
a steel pipe accommodating portions of each of the three three-phase power cable pairs, and the three rubber connecting tubes; and
a heat dissipation material provided between the steel pipe and each of the three rubber connecting tubes, and making contact with the steel pipe and each of the three rubber connecting tubes,
wherein the heat dissipation material includes a heat dissipating metal that has a melting point lower than a melting point of the steel pipe.

Clause 2. The cable connecting structure according to clause 1, wherein the heat dissipation material includes a porous metal.

Clause 3. The cable connecting structure according to clause 2, wherein the heat dissipation material has a porosity that is 50% or higher.

Clause 4. The cable connecting structure according to clause 2, wherein the heat dissipation material on a side of the steel pipe has a porosity lower than a porosity of the heat dissipation material on a side of each of the three rubber connecting tubes.

Clause 5. The cable connecting structure according to clause 4, wherein at least a portion of the heat dissipation material on the side of the steel pipe includes a solid metal.

Clause 6. The cable connecting structure according to clause 4 or 5, wherein an average porosity of the heat dissipation material along a thickness direction thereof is 50% or higher.

Clause 7. The cable connecting structure according to any one of clauses 4 to 6, wherein the porosity of the heat dissipation material gradually decreases from the side of each of the three rubber connecting tubes toward the side of the steel pipe.

Clause 8. The cable connecting structure according to any one of clauses 1 to 7, wherein the metal included in the heat dissipation material has a relative permeability that is 1000 or higher.

Clause 9. The cable connecting structure according to any one of clauses 1 to 8, wherein the heat dissipation material at a temperature of 20° C. has a volume resistivity that is $1 \times 10^{-7} \Omega \cdot m$ or lower.

Clause 10. The cable connecting structure according to any one of clauses 1 to 9, wherein the heat dissipation material on a side of the steel pipe has a resistance lower than a resistance of the heat dissipation material on a side of each of the three rubber connecting tubes.

Clause 11. The cable connecting structure according to clause 10, wherein the resistance of the heat dissipation material decreases in stages from the side of each of the three rubber connecting tubes toward the side of the steel pipe.

Clause 12. The cable connecting structure according to any one of clauses 1 to 11, wherein
each power cable of the three three-phase power cable pairs includes, from a center toward an outer periphery thereof, a conductor, an insulating layer, and a shielding layer, and
the shielding layer of each of the three three-phase power cable pairs are grounded altogether with the steel pipe.

Clause 13. The cable connecting structure according to clause 12, further comprising:
a return cable installed together with the three three-phase power cable pairs, and grounded together with the steel pipe and the shielding layer of each of the three three-phase power cable pairs.

Clause 14. The cable connecting structure according to any one of clauses 1 to 13, wherein at least a portion of the heat dissipation material is formed in a sheet shape.

Clause 15. The cable connecting structure according to clause 14, wherein at least a portion of the heat dissipation material is wound around each of the three rubber connecting tubes.

Clause 16. The cable connecting structure according to any one of clauses 1 to 15, further comprising:
a spacer configured to adjust positions of the three rubber connecting tubes inside the steel pipe.

Clause 17. The cable connecting structure according to clause 16, wherein the spacer includes
a core section, inserted between the three rubber connecting tubes, and configured to restrict movements of the three three-phase power cable pairs toward a center axis of the steel pipe, and
a support section configured to support the core section, while making contact with an inner peripheral portion of the steel pipe, so that a position of the core section inside the steel pipe is adjustable.

Clause 18. The cable connecting structure according to any one of clauses 1 to 17, further comprising:
a binder binding the three three-phase power cable pairs.

Clause 19. A cable connecting structure comprising:
a power cable pair including a pair of power cables that are mutually connected;
an insulating rubber connecting tube covering a connecting section of the power cable pair;
a steel pipe accommodating a portions of the power cable pair, and the rubber connecting tube;
a heat dissipation material provided between the steel pipe and the rubber connecting tube, and making contact with the steel pipe and the rubber connecting tube,
wherein the heat dissipation material includes a heat dissipating metal that has a melting point lower than a melting point of the steel pipe.

Clause 20. A member for a cable connecting structure, comprising:
three insulating rubber connecting tubes covering connecting sections of three three-phase power cable pairs respectively including a pair of power cables that are mutually connected, respectively;
a steel pipe accommodating portions of each of the three three-phase power cable pairs, and the three rubber connecting tubes; and
a heat dissipation material provided between the steel pipe and each of the three rubber connecting tubes, and making contact with the steel pipe and each of the three rubber connecting tubes,
wherein the heat dissipation material includes a heat dissipating metal that has a melting point lower than a melting point of the steel pipe.

Clause 21. A power transmission system comprising:
a plurality of three-phase power cables; and
a cable connecting structure configured to connect the plurality of three-phase power cables,
wherein the cable connecting structure includes
three three-phase power cable pairs respectively including a pair of power cables that are mutually connected, among the plurality of three-phase power cables,
three insulating rubber connecting tubes covering connecting sections of the three three-phase power cable pairs, respectively,
a steel pipe accommodating portions of each of the three three-phase power cable pairs, and the three rubber connecting tubes, and
a heat dissipation material provided between the steel pipe and each of the three rubber connecting tubes, and making contact with the steel pipe and each of the three rubber connecting tubes,
wherein the heat dissipation material includes a heat dissipating metal that has a melting point lower than a melting point of the steel pipe.

Clause 22. A method of manufacturing a cable connecting structure, comprising:
forming three three-phase power cable pairs respectively including a pair of power cables that are mutually connected;
covering connecting sections of the three three-phase power cable pairs by three insulating rubber connecting tubes, respectively; and
accommodating portions of each of the three three-phase power cable pairs, and the three rubber connecting tubes, inside a steel pipe, and arranging a heat dissipation material between the steel pipe and each of the three rubber connecting tubes to making contact with the steel pipe and each of the three rubber connecting tubes,
wherein the heat dissipation material includes a heat dissipating metal that has a melting point lower than a melting point of the steel pipe.

What is claimed is:

1. A cable connecting structure comprising:
a first three-phase power cable pair, a second three-phase power cable pair, and a third three-phase power cable pair, respectively including a pair of power cables that are mutually connected;
three insulating rubber connecting tubes covering connecting sections of the first, second, and third three-phase power cable pairs, respectively;
a steel pipe accommodating portions of each of the first, second, and third three-phase power cable pairs, and the three rubber connecting tubes; and
a heat dissipation material provided between the steel pipe and each of the three rubber connecting tubes, and making contact with the steel pipe and each of the three rubber connecting tubes,
wherein the heat dissipation material includes a heat dissipating porous metal that has a melting point lower than a melting point of the steel pipe, and
wherein the heat dissipation porous material on a side of the steel pipe has a porosity lower than a porosity of the heat dissipation porous material on a side of each of the three rubber connecting tubes.

2. The cable connecting structure as claimed in claim 1, wherein the heat dissipation material has a porosity that is 50% or higher.

3. The cable connecting structure as claimed in claim 1, wherein at least a portion of the heat dissipation porous material on the side of the steel pipe includes a solid metal.

4. The cable connecting structure as claimed in claim 1, wherein an average porosity of the heat dissipation porous material along a thickness direction thereof is 50% or higher.

5. The cable connecting structure as claimed in claim 1, wherein the porosity of the heat dissipation porous material gradually decreases from the side of each of the three rubber connecting tubes toward the side of the steel pipe.

6. The cable connecting structure as claimed in claim 1, wherein the metal included in the heat dissipation porous material has a relative permeability that is 1000 or higher.

7. The cable connecting structure as claimed in claim 1, wherein the heat dissipation porous material at a temperature of 20° C. has a volume resistivity that is $1 \times 10^{-7} \Omega \cdot m$ or lower.

8. The cable connecting structure as claimed in claim 1, wherein at least a portion of the heat dissipation porous material is formed in a sheet shape.

9. The cable connecting structure as claimed in claim 8, wherein at least a portion of the heat dissipation porous material is wound around each of the three rubber connecting tubes.

10. The cable connecting structure as claimed in claim 1, further comprising:
a spacer configured to adjust positions of the three rubber connecting tubes inside the steel pipe.

11. A cable connecting structure comprising:
a first three-phase power cable pair, a second three-phase power cable pair, and a third three-phase power cable pair, respectively including a pair of power cables that are mutually connected;
three insulating rubber connecting tubes covering connecting sections of the first, second, and third three-phase power cable pairs, respectively;
a steel pipe accommodating portions of each of the first, second, and third three-phase power cable pairs, and the three rubber connecting tubes; and a heat dissipation material provided between the steel pipe and each of the three rubber connecting tubes, and making contact with the steel pipe and each of the three rubber connecting tubes, wherein the heat dissipation material includes a heat dissipating metal that has a melting point lower than a melting point of the steel pipe, and wherein the heat dissipation material on a side of the steel pipe has a resistance lower than a resistance of the heat dissipation material on a side of each of the three rubber connecting tubes.

12. The cable connecting structure as claimed in claim 11, wherein the resistance of the heat dissipation material decreases in stages from the side of each of the three rubber connecting tubes toward the side of the steel pipe.

13. The cable connecting structure as claimed in claim 11, wherein the heat dissipation material on a side of the steel pipe has a porosity lower than a porosity of the heat dissipation material on a side of each of the three rubber connecting tubes, and an average porosity of the heat dissipation material along a thickness direction thereof is 50% or higher.

14. The cable connecting structure as claimed in claim 11, further comprising:

a spacer configured to adjust positions of the three rubber connecting tubes inside the steel pipe.

15. A cable connecting structure comprising:

a first three-phase power cable pair, a second three-phase power cable pair, and a third three-phase power cable pair, respectively including a pair of power cables that are mutually connected;

three insulating rubber connecting tubes covering connecting sections of the first, second, and third three-phase power cable pairs, respectively;

a steel pipe accommodating portions of each of the first, second, and third three-phase tower cable pairs, and the three rubber connecting tubes;

a heat dissipation material provided between the steel pipe and each of the three rubber connecting tubes, and making contact with the steel pipe and each of the three rubber connecting tubes; and a return cable installed together with the first, second, and third three-phase power cable pairs, and grounded together with the steel pipe and the shielding layer of each of the first, second, and third three-phase power cable pairs, wherein the heat dissipation material includes a heat dissipating metal that has a melting point lower than a melting point of the steel pipe, wherein each power cable of the first, second, and third three-phase power cable pairs includes, from a center toward an outer periphery thereof, a conductor, an insulating layer, and a shielding layer, and wherein the shielding layer of each of the first, second, and third three-phase power cable pairs are grounded altogether with the steel pipe.

16. The cable connecting structure as claimed in claim 15, wherein the heat dissipation material on a side of the steel pipe has a porosity lower than a porosity of the heat dissipation material on a side of each of the three rubber connecting tubes, and an average porosity of the heat dissipation material along a thickness direction thereof is 50% or higher.

17. The cable connecting structure as claimed in claim 15, further comprising:

a spacer configured to adjust positions of the three rubber connecting tubes inside the steel pipe.

18. A cable connecting structure comprising:

a first three-phase power cable pair, a second three-phase power cable pair, and a third three-phase power cable pair, respectively including a pair of power cables that are mutually connected;

three insulating rubber connecting tubes covering connecting sections of the first, second, and third three-phase power cable pairs, respectively;

a steel pipe accommodating portions of each of the first, second, and third three-phase power cable pairs, and the three rubber connecting tubes;

a heat dissipation material provided between the steel pipe and each of the three rubber connecting tubes, and making contact with the steel pipe and each of the three rubber connecting tubes; and a spacer configured to adjust positions of the three rubber connecting tubes inside the steel pipe, wherein the heat dissipation material includes a heat dissipating metal that has a melting point lower than a melting point of the steel pipe, and wherein the spacer includes a core section, inserted between the three rubber connecting tubes, and configured to restrict movements of the first, second, and third three-phase power cable pairs toward a center axis of the steel pipe, and a support section configured to support the core section, while making contact with an inner peripheral portion of the steel pipe, so that a position of the core section inside the steel pipe is adjustable.

19. The cable connecting structure as claimed in claim 18, wherein the heat dissipation material on a side of the steel pipe has a porosity lower than a porosity of the heat dissipation material on a side of each of the three rubber connecting tubes, and an average porosity of the heat dissipation material along a thickness direction thereof is 50% or higher.

20. A member for a cable connecting structure, comprising:

three insulating rubber connecting tubes covering connecting sections of a first three-phase power cable pair, a second three-phase power cable pair, and a third three-phase power cable pair respectively including a pair of power cables that are mutually connected, respectively;

a steel pipe accommodating portions of each of the first, second, and third three-phase power cable pairs, and the three rubber connecting tubes; and a heat dissipation material provided between the steel pipe and each of the three rubber connecting tubes, and making contact with the steel pipe and each of the three rubber connecting tubes, wherein the heat dissipation material includes a heat dissipating metal that has a melting point lower than a melting point of the steel pipe, and wherein the heat dissipation material on a side of the steel pipe has a porosity or resistance lower than that of the heat dissipation material on a side of each of the three rubber connecting tubes.

21. A method of manufacturing a cable connecting structure, comprising:

forming a first three-phase power cable pair, a second three-phase power cable pair, and a third three-phase power cable pair respectively including a pair of power cables that are mutually connected;

covering connecting sections of the first, second, and third three-phase power cable pairs by three insulating rubber connecting tubes, respectively; and accommodating portions of each of the first, second, and third three-phase power cable pairs, and the three rubber connecting tubes, inside a steel pipe, and arranging a heat dissipation material between the steel pipe and each of the three rubber connecting tubes to making contact with the steel pipe and each of the three rubber connecting tubes, wherein the heat dissipation material includes a heat dissipating metal that has a melting point lower than a melting point of the steel pipe, and wherein the heat dissipation material on a side of the steel pipe has a porosity lower than a porosity of the heat dissipation material on a side of each of the three rubber connecting tubes.

\* \* \* \* \*